April 25, 1939.  F. W. BURGER  2,155,988
WHEEL ASSEMBLY
Filed Sept. 27, 1935  3 Sheets-Sheet 1

Inventor:
Frederick W. Burger

April 25, 1939.　　　　F. W. BURGER　　　　2,155,988
WHEEL ASSEMBLY
Filed Sept. 27, 1935　　3 Sheets-Sheet 3
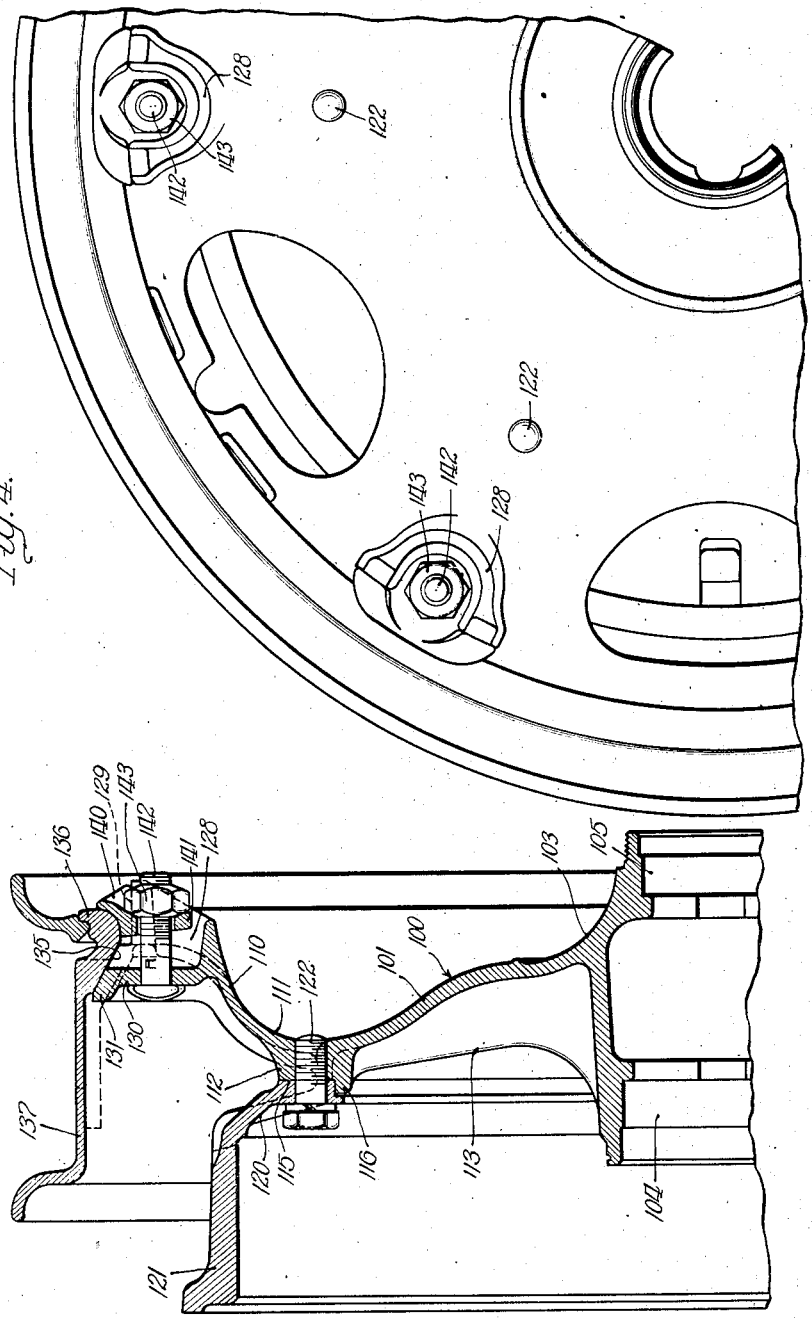
Inventor:
Frederick W. Burger Patented Apr. 25, 1939

2,155,988

UNITED STATES PATENT OFFICE 2,155,988

WHEEL ASSEMBLY

Frederick W. Burger, Niles, Mich., assignor to Clark Equipment Company, Buchanan, Mich., a corporation of Michigan Application September 27, 1935, Serial No. 42,382

9 Claims. (Cl. 301—12)

The present invention relates generally to wheels for automotive vehicles and the like and is more particularly directed to wheels using one or more demountable rims.

The principal object of the present invention is the provision of a wheel of the disc type but adapted to use demountable rims of conventional construction. Heretofore, disc wheels have generally been provided with fixed rims. Another object of the present invention is the provision of a convertible dual wheel construction enabling the operator to change over from a dual-rimmed wheel to a single wheel construction with minimum effort and a minimum number of auxiliary parts while, in both cases, providing for the proper disposition of the rim means, whether a single rim or a dual rim arrangement, with respect to the center of thrust or pressure and the hub and associated bearings carrying the load imposed on the wheel.

A further object of the present invention is the provision of a new and improved wheel construction especially adapted for edge-mounted rims and so arranged that the rim may be placed in either of two positions, thereby easily and conveniently accommodating a change-over from a single rim arrangement to a dual rim arrangement. A further object of the present invention is the provision of a new and improved wheel body for wheels of this general type, the wheel body preferably being of disc-like construction and formed to bring the rim into proper lateral position with respect to the lines of thrust and reaction existing when the wheel is under load.

These and other objects and advantages of the present invention will be apparent to those skilled in the art after a consideration of the following detailed description of the preferred structural embodiments, taken in conjunction with the accompanying drawings illustrating such embodiments.

In the drawings:

Figure 3 is a vertical section taken through a modified form of the present invention; and Figure 4 is a side view of a portion of the wheel shown in Figure 3, Figure 4 also being typical, so far as a side view of the wheel body portions and the rim clamping lugs are concerned, of the wheel constructions shown in Figures 1 and 2.

Figure 1:
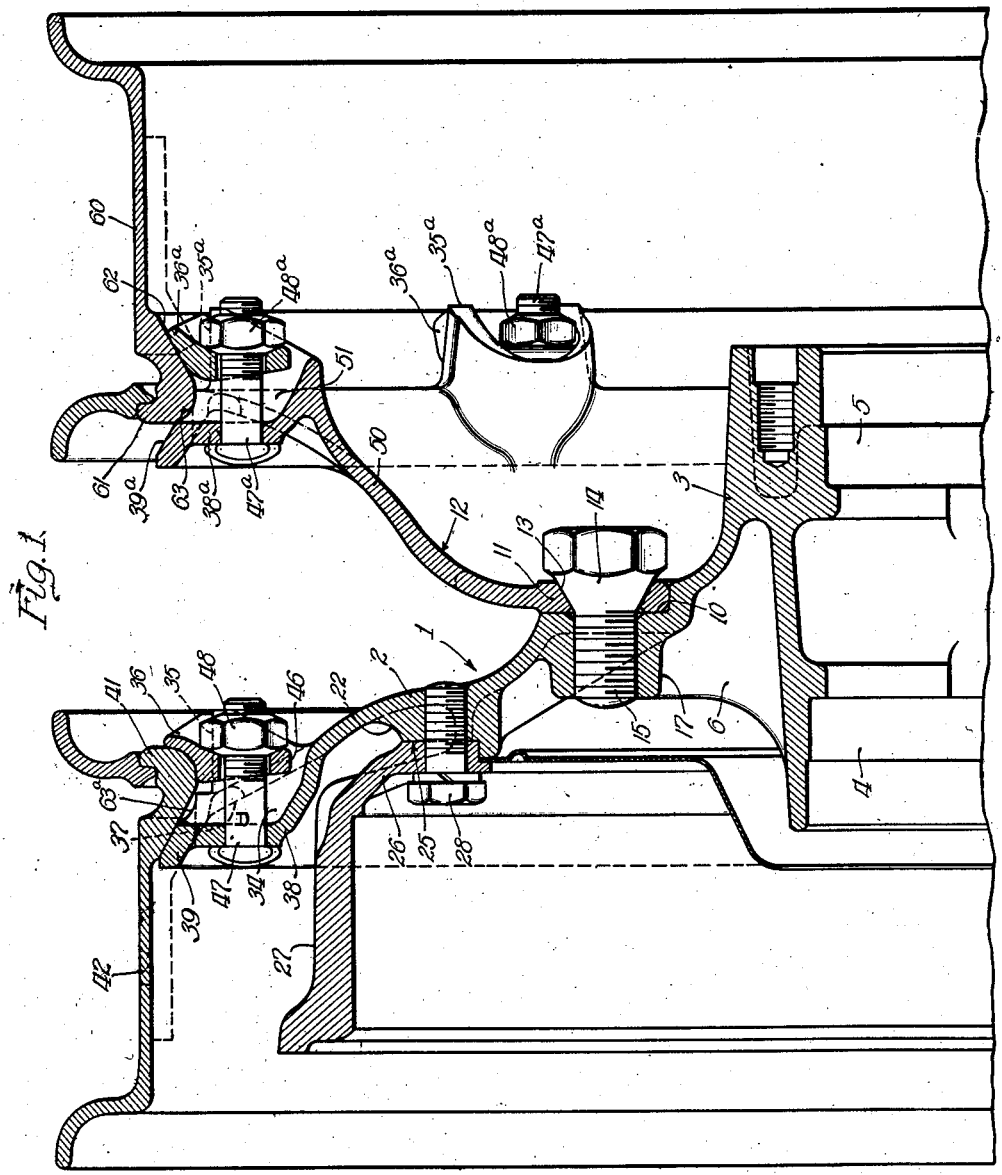
Figure 1 is a vertical section taken through a wheel embodying the principles of the present invention and illustrating the parts as they appear when they are arranged for a dual rim construction.

Referring now more particularly to Figure 1, the reference numeral 1 indicates the supporting wheel body or spider as a whole, which includes a disc-like wheel body 2 and an integral hub section 3 having bearing receiving surfaces 4 and 5 and reenforcing web sections 6 effectively joining the wheel body proper and the hub 3 so as to withstand the severe stresses to which wheels of the illustrated type are subjected. The wheel body 1 is preferably formed as a dished or disc-like member and, radially outwardly of the hub 3, is formed with a recess or groove 10 which receives the radially innermost portion 11 of an auxiliary wheel body section 12. The radially innermost portion 11 is provided with a plurality of tapered apertures 13 arranged to receive the conical heads 14 of securing screws or bolts 15 by which, when it is desired to employ two rims, the auxiliary wheel body section 12 may be mounted in position on a wheel body proper 2. It is to be noted that the fastening means 15 and the junction between the auxiliary wheel body section and the wheel body itself are disposed in a plane which passes substantially through the central portion of the hub 3 and in between the bearing receiving portions or surfaces 4 and 5. The wheel body 2 is preferably formed with a plurality of apertured bosses 17 apertured to receive the threaded ends of the bolts 15 and, in addition, arranged so as to reenforce the webs 6.

Radially outwardly of the bolt receiving bosses 17, the wheel body 2 is provided with a second set of threaded bosses 22, which may be in the nature of a second circumferential portion having a groove 25 machined or otherwise accurately formed therein to receive the flange 26 of a brake drum 27, the latter being secured in place by a plurality of cap screws 28 or the like. The brake drum 27 is attached to a reenforced portion of the wheel body 2 which is disposed laterally inwardly with respect to the central plane of the hub 3, and the radially outer or peripheral portion of the wheel body 2 outwardly of the portion 22 is disposed still further laterally inwardly so as to at least partially embrace the brake drum 27. The laterally inwardly directed peripheral portion of the wheel body 2 is formed with a plurality of rim receiving means in the form of sockets 34. Each of the sockets 34 includes a pair of spaced parallel shoulders 35 extending laterally outwardly of the wheel body 2 and which slidably receive rim clamping lug means 36 (Figure 1). The walls of the socket 34 forming the shoulders 35 extend laterally inwardly beyond the general plane of the peripheral portion of the wheel body 2, as indicated at 37, and the walls 35 are joined together by an integral generally radially extending connecting wall portion 38 which, at its radially inner portion, merges into the wheel body proper. The radially outermost circumferentially extending edge of the wheel body 1 is formed with a continuous tapered section, indicated by the reference numeral 39 which, as to angularity, conforms to the usual beveled or tapered gutter portion 41 of a conventional edge-mounted rim, indicated at 42, the laterally inner wall portion 38 of the lug sockets 35 merging into the tapered section 39. In Figure 1, the rim 42 is shown as overhanging the brake drum 27. The lug 36 has a portion engaging the laterally outermost edge of the rim 42 and has the usual clamping ear 46 apertured to receive a clamping bolt 47 carrying a nut 48 which, when tightened, serves to shift the lug 36 laterally inwardly along the spaced shoulders 35 to force the laterally outermost part of the tapered edge of the rim 42 into secure engagement on the tapered surfaces 39. While the portion 39 of the wheel body is preferably a continuous conical section, it may be made in the form of separated segments to provide for chording the rim, if desired.

As will be explained later, the rim receiving means just described is also so constructed and arranged that the rim 42 may be disposed with its free edge in a laterally outer position (Figure 2), and from Figure 1 it will be observed that the peripheral portion of the wheel body 2, carrying the rim receiving means, is spaced laterally inwardly of the central plane of the hub 3 a distance substantially equal to approximately half of the width of the rim 42. By virtue of this construction, when the rim 42 is reversed from the position shown is Figure 1 to the position shown in Figure 2, the central plane of the rim coincides with the central plane of the hub 3.

The auxiliary wheel body section 12, shown in Figure 1, includes a laterally outwardly directed section 50 carrying a peripherally disposed series of rim receiving means in the form of sockets 51 which are substantially identical with the sockets 34 and associated parts described above. Each of the rim receiving sockets 51 includes a pair of shoulders 35a extending laterally outwardly of the wheel body section 12 and joined radialy inwardly thereof by a wall 38a having a radially outer tapered portion 39a. The wall 38a is apertured to receive a clamping bolt 47a having a nut 48a bearing against a clamping lug 36a slidably disposed on the shoulders 35a. The laterally outer rim, indicated by the reference numeral 60, is preferably the same as the rim 42, having a gutter edge 61 formed with a tapered section 62 which is engaged by the correspondingly tapered portions of the associated clamping lugs 36a. The laterally innermost edge 61 of the rim 60 is adapted to lie against the wall 38a, the curved portion of the rim edge lying in a notch 63 formed in each of the walls 35a. A similar notch 63a is formed in each of the walls 35 of the wheel body 2.

From Figure 1 it will be observed that the rim receiving means, comprising the lug receiving sockets 51 and associated parts, is disposed laterally outwardly of the central plane of the hub 3 a distance substantially equal to one-half the distance of the rim 60 and that a plane passing midway between the rims 42 and 60 also passes through the central portion of the hub 3 and the securing means 15 fastening the auxiliary wheel body section 12 into position on the wheel body proper 2. Thus, considering the two rims 42 and 50 as a whole, the loads which the rims impose on the wheel are carried directly to the hub 3 by the wheel bodies 2 and 12 substantially midway between the bearing surfaces 4 and 5 of the hub 3.

Figure 2:
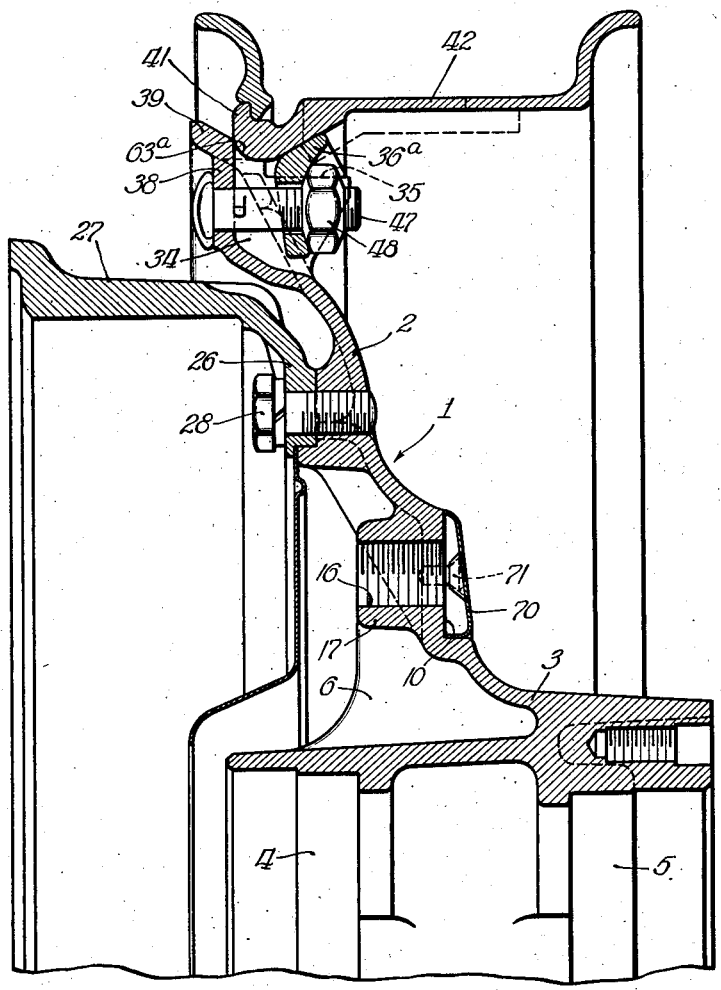
Figure 2 is a view similar to Figure 1, but showing the parts when they are arranged to support a single rim.

The wheel construction illustrated in Figure 1 may be easily and conveniently changed over into a single wheel construction merely by the removal of the auxiliary wheel body 12 and associated parts and the reversal of the rim 42. The single rim assembly secured by the present wheel construction is indicated in Figure 2 and it will be observed, in the first instance, that the central plane of the rim 42 in this position substantially coincides with the central plane of the wheel hub 3. In Figure 2 the free edge of the rim 42 is now disposed laterally outwardly of the wheel body but, due to the laterally inward disposition of the peripheral portion of the wheel body 2, the gutter edge 41 of the rim 42 partially embraces the brake drum 27. When the rim 42 is arranged with its free edge as disposed laterally outwardly, the gutter edge thereof seats in the notches 63a in the walls 35 and up against the edge of the radially outwardly extending wall portion 38, which, as described above, joins the shoulders 35 on the laterally inner side of the general plane of the wheel body 2. When the rim 42 is arranged in this manner, clamping lugs, such as the lugs 36a, are used to replace the lugs 36 so as to firmly secure the rim 42 in its new position. The openings 16 in the bosses 17 are covered by an ornamental collar 70 secured in place by small screws 71, the collar 70 being disposed in the recessed groove 10.

The construction described above in connection with Figures 1 and 2 is preferably one particularly adapted for the rear wheels of automotive vehicles, such as trucks, busses and the like, in which in some instances dual wheels are desired while in other cases single wheels suffice. The construction described above is admirably adapted to accommodate either requirement with a minimum number of auxiliary parts. It is to be noted from Figure 1 that the rim 60 might be reversed if desired, merely by using lugs similar to the lugs 36 employed with the wheel body 2 and forcing the tapered or wedge surface 62 onto the tapered portion 39a of the detachable wheel body section 12. Moreover, when the rim 60 is reversed in this manner, it is to be noted that the central plane of the rim coincides with the central portion or intersects the central portion of the wheel hub 3. However, when the rim 60 is reversed in this manner, the removal of the laterally inner rim 42 and the associated clamping lugs is desirable.

A front wheel construction embodying a number of the features described above in connection with the convertible wheel arrangement is illustrated in Figures 3 and 4. In Figure 3 the combined wheel body and hub construction is indicated in its entirety by the reference numeral 100 and includes a disc-like wheel body section 101 and an integral hub 103 formed with bearing receiving sections 104 and 105. The wheel body or spider 101 is formed with a laterally outwardly directed section 110 connected with the radially innermost portions of the wheel body 101 by a reentrant curved section 111 which is formed with thickened portions 112 connected with the hub 103 by reenforcing webs 113. A recessed groove 115 having a shoulder 116 is formed on the thickened section 112 and serves to receive the flange 120 of a brake drum 121 which is secured to the wheel body 101 by cap screws 122.

The peripheral portion of the laterally outwardly directed wheel body section 110 carries rim receiving means substantially identical with those described above, comprising a plurality of lug receiving sockets 128, each of which is defined by a pair of spaced shoulders 129 disposed on the laterally outer side of the general plane of the peripheral portion of the wheel body, the walls forming the shoulders 129 being joined together on the opposite side of the plane of the periphery of the wheel body by a radially extending wall section 130 which terminates radially outwardly in an inclined wedge or conical section 131 conforming in angularity to the wedge or tapered portion 135 of the rim gutter 136, and preferably, but not necessarily being circumferentially continuous.

The rim is indicated in its entirety by the reference numeral 137 and is held in place by suitable clamping lugs 140, each of which carries an apertured ear 141 which receives a clamping bolt 142 carrying a nut 143, this construction being substantially identical for all practical purposes with the lugs 36a and associated parts described above.

In the construction shown in Figure 3, as in the modifications previously described, by virtue of the lateral disposition of the radially outer peripheral portions of the wheel body, the edge mounted rim carried thereby is disposed in such a position that the central plane of the rim substantially coincides with the central portion of the wheel hub so that in all cases the line of thrust of the rim is received by the associated hub substantially midway between the bearing surfaces upon which the wheel is mounted.

While I have shown and described above the preferred form of my invention, it will be apparent to those skilled in the art that the present invention is not to be limited to the particular details shown and described above, but that, in fact, widely different means may be employed in the practice of the broader aspects of my invention.

What I claim, therefore, and desire to secure by Letters Patent is:

1. A wheel disk for supporting a tire rim on the hub portion of a wheel comprising a disc-like member extending radially outwardly from said hub portion and having spaced laterally offset portions about its periphery, said offset portions comprising sockets having radially extending rear walls terminating in rim-receiving surfaces inclined at an angle to the axis of the wheel, and spaced parallel shoulders extending normal to said rear walls and spaced radially inwardly thereof for guiding rim-engaging lugs axially of said sockets, and intermediate axial seats between said walls and said shoulders.

2. A wheel disk for supporting a beveled gutter type tire rim on the hub portion of a wheel body comprising a plate member having a laterally offset peripheral portion about which said rim is adapted to extend, a series of circumferentially spaced sockets adjacent said peripheral portion extending axially of said disk and having extending rear walls inclined at an angle to the axis of the wheel body to provide wedge seating surfaces for said rim when the rim gutter is engaged therewith, shoulders defined by the side walls of said sockets for guiding rim engaging lugs into clamping engagement with said rim, and seats formed in portions of said side walls between the shoulders and the seating surface of each socket for receiving the gutter edge of a rim when said rim is in position overhanging said sockets.

3. A wheel comprising an integral disc-like wheel body having a central portion and a laterally directed radially outer circumferentially continuous peripheral portion, and a peripheral series of rim lug receiving sockets, each including a pair of circumferentially spaced laterally directed lug receiving shoulders extending at one side of the wheel body and a laterally inwardly disposed wall section at the other side thereof joining said shoulders, said laterally inwardly disposed wall having a peripherally extending beveled surface circumferentially continuous between said sockets and adapted to receive the tapered gutter portion of an edge mounted rim when in inboard extending position, and intermediate axial seats having radial inboard abutments between said shoulders and said beveled surface for receiving said rim when in position overhanging said sockets.

4. A wheel comprising a disc-like wheel body carrying a central hub section and a laterally inwardly directed radially outer peripheral section extending into substantially planar alinement with the inner end of said hub portion, said section having a series of axially directed seats with radial shoulders at the inboard ends thereof, rim lug receiving sockets carried by said laterally inwardly directed peripheral wheel body section radially inwardly of said seats, a rim of substantially the width of said hub portion disposed over said sockets and having a tapered portion at its laterally inner edge, and wedge-shaped lug means movable in said socket for engaging the tapered portion of said rim to move the laterally inner edge of said rim into abutment against said shoulders on said laterally inwardly directed peripheral wheel body portion, the major portion of said rim extending laterally outwardly of said sockets whereby the central plane of the rim passes through the central portion of said hub.

5. In a wheel, a wheel body having rim receiving sections adapted to receive a rim of the edge mounted tapered gutter type in either of two positions, one with the gutter edge disposed laterally outwardly and the other with the gutter edge disposed laterally inwardly of the wheel, each of said rim receiving sections comprising a pair of spaced rim lug receiving shoulders disposed at one side of the wheel body, and a laterally inwardly disposed wall section inclined at an angle to the axis of the wheel body and adapted to receive the rim in said one position in wedging relation and spaced radially outwardly of said sections by a radial wall forming abutment means receiving the edge of a rim disposed in said other position.

6. An article of manufacture comprising a disc-like wheel body having an integral hub section and a laterally deflected peripheral portion having a circumferential series of rim lug receiving sockets, each comprising a pair of spaced laterally extending shoulders extending on both sides of the general plane of said peripheral wheel body portion, a laterally outwardly facing rim edge receiving abutment formed radially outwardly of said shoulders, and a wall section disposed on the laterally inner side of said peripheral wheel body portion and serving to integrally connect the laterally inner ends of said shoulders, said wall section continuing radially outwardly past said abutment and being inclined laterally inwardly and radially outwardly to form a peripheral rim receiving seat.

7. An article of manufacture comprising a disc-like wheel body having an integral hub section and a laterally deflected peripheral portion having a circumferential series of lug receiving sockets, each comprising a pair of spaced laterally extending shoulders extending on both sides of the general plane of said peripheral wheel body portion, a laterally outwardly facing abutment associated with said shoulders and adapted to be engaged by the laterally inner edge of a rim so as to dispose the latter in laterally outwardly overhanging relation when the wheel body is employed in a single rim wheel assembly, and a wall section disposed on the laterally inner side of said peripheral wheel body portion and having a circumferentially extending radially outwardly facing beveled surface adapted to receive the beveled laterally outwardly disposed gutter edge of the laterally inner rim when the wheel body is employed in a dual wheel assembly.

8. A wheel body adapted for reversible mounting of a beveled edge type rim comprising a hub section and a peripheral flange portion, said flange portion terminating in a peripheral beveled edge forming one series of rim receiving seats, axially outwardly directed lug receiving shoulders disposed radially inwardly of said edge, and an intermediate series of rim receiving seats between said edge and said shoulder having radial abutments extending toward said edge.

9. A wheel body adapted for both single and dual rim mounting, comprising a hub section and a laterally inwardly directed peripheral flange portion formed with separate series of rim receiving seats arranged to support an edge mounted rim with its free edge disposed either laterally inwardly or laterally outwardly of said seats, one series of said seats comprising beveled surfaces for receiving the beveled edge of a gutter type rim, the other series of said seats comprising axial surfaces terminating in radial shoulders forming abutments for the lateral edge of a gutter type rim and with lug receiving shoulders disposed laterally outwardly of and radially inwardly of both series of seats for use when a rim is mounted in either position.

FREDERICK W. BURGER.